(12) United States Patent
Blanchard et al.

(10) Patent No.: US 10,598,031 B2
(45) Date of Patent: Mar. 24, 2020

(54) TURBINE ROTOR WITH AIR SEPARATION FERRULES FOR COOLING OF BLADE AND DISK COUPLING PORTIONS, FOR A TURBOMACHINE

(71) Applicant: SAFRAN AIRCRAFT ENGINES, Paris (FR)

(72) Inventors: Stéphane Pierre Guillaume Blanchard, Chartrettes (FR); Joao Antonio Amorim, Villeparisis (FR); Maxime Aurélien Rotenberg, Fresnes (FR); Nicolas Xavier Trappier, Maisons Alfort (FR)

(73) Assignee: SAFRAN AIRCTAFT ENGINES, Paris (FR)

( * ) Notice: Subject to any disclaimer, the term of this patent is extended or adjusted under 35 U.S.C. 154(b) by 176 days.

(21) Appl. No.: 15/698,927

(22) Filed: Sep. 8, 2017

(65) Prior Publication Data

US 2018/0066528 A1    Mar. 8, 2018

(30) Foreign Application Priority Data

Sep. 8, 2016 (FR) .................................... 16 58367

(51) Int. Cl.
*F01D 5/30*    (2006.01)
*F01D 5/08*    (2006.01)

(52) U.S. Cl.
CPC .......... *F01D 5/3007* (2013.01); *F01D 5/082* (2013.01); *F01D 5/3015* (2013.01); *F05D 2260/30* (2013.01); *Y02T 50/671* (2013.01); *Y02T 50/676* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,232,339 A | * | 8/1993 | Plemmons | .............. F01D 5/084 |
| | | | | 415/177 |
| 2013/0078101 A1 | * | 3/2013 | Garin | ...................... F01D 5/081 |
| | | | | 416/204 R |

FOREIGN PATENT DOCUMENTS

| | | |
|---|---|---|
| FR | 2 953 250 A1 | 6/2011 |
| FR | 2 961 249 A1 | 12/2011 |

(Continued)

OTHER PUBLICATIONS

Search Report as issued in French Patent Application No. 1658367, dated Mar. 2, 2017.

*Primary Examiner* — Richard A Edgar
*Assistant Examiner* — Maxime M Adjagbe
(74) *Attorney, Agent, or Firm* — Pillsbury Winthrop Shaw Pittman LLP

(57) ABSTRACT

A turbine rotor is fitted to a turbomachine and includes disks each containing a coupling portion with recesses each holding a root of a blade, and coupled to one another by a first annular ferrule attached to one of them close to the recesses, and second rotationally coupled ferrules, which are respectively coupled radially to the disks, which each consists of at least two semi-annular sectors, and which form with the associated disk a space which communicates with the recesses of the coupling portion of this latter disk. In addition, each first ferrule includes through-holes enabling air to enter this space, and then the recesses, intended to cool the coupling portion which couples its disk and the blade roots.

10 Claims, 2 Drawing Sheets

(56) References Cited

FOREIGN PATENT DOCUMENTS

FR 2 965 291 A1 3/2012
FR 3 019 584 A1 10/2015

* cited by examiner

TURBINE ROTOR WITH AIR SEPARATION FERRULES FOR COOLING OF BLADE AND DISK COUPLING PORTIONS, FOR A TURBOMACHINE

CROSS-REFERENCE TO RELATED APPLICATIONS

This application claims priority to French Patent Application No. 1658367, filed Sep. 8, 2016, the entire content of which is incorporated herein by reference in its entirety.

FIELD

The invention concerns turbines fitted to turbomachines, and more specifically the rotors which form part of such turbines.

It will be noted that the invention concerns not only turbojets and turboprop engines which are fitted, in particular, to aircraft, but also industrial gas turbine turbomachines.

BACKGROUND

A turbomachine habitually contains at least one portion dedicated to compressing the air which it takes in. This compressed air enters a combustion chamber, where it is mixed with a fuel before the resulting mix is ignited, producing hot combustion gases. These gases are then decompressed in a high-pressure stage of the turbine, and then in at least one low-pressure stage of this same turbine.

Each stage of the turbine generally includes a series of fixed blades (or distributors), followed by at least one (turbine) rotor. This rotor contains at least two series of moving blades which are attached respectively to disks which are rotationally coupled to one another.

Each disk in fact includes a coupling portion with recesses (or cells), which each hold a blade root of a series. In addition, in a conventional rotor, most of the disks include an "upstream" arm and a "downstream" arm which is rotationally coupled to the upstream arm of the next disk by bolted joints.

Due to the increasingly constrained environment of turbines in terms of operating temperatures and rotor rotation speeds, and to the increasingly large diameters of these turbines, phenomena occur of separation of flanges, and of high stresses in the inter-disk bolted joints. These joints also involve very considerable accessibility constraints for installation equipment.

To reduce the temperature stress in order to give the portions coupling the blades (blade roots) and the disks longer lifetimes, they should be cooled by means of cooling air, which is guided to them (and in particular as far as the blade root recesses (or cells)), without being mixed in with the hot stream air which flows under the low-pressure distributors (or DBPs). Indeed, such mixing would heat the cooling air, leading to a loss of cooling function at the base of the cell.

In a conventional rotor (with inter-disk bolted joints) the cooling air is guided by a labyrinth ring which is attached via a flange to the bolted joints, and which is positioned in front of an "outer" face of the disk's upstream arm, as described in patent document FR 3019584. This flange contains holes allowing air to enter a space defined between the "inner" face of the labyrinth ring and the outer face of the disk's upstream arm.

In order to reduce the phenomena of separation of flanges and the stresses in the inter-disk bolted joints, while reducing the rotor's total mass, it has been proposed to reduce the mass, the encumbrance and possibly the number of inter-disk bolted joints. Such rotors are generally of the "spool" or "drilled" type.

In both these rotor types inclusion of the cooling air supply means intended for the blade/disk coupling portions poses problems. More specifically, a spool rotor does not enable a labyrinth ring to be included, and the addition of a labyrinth ring between the disks of a drilled rotor makes this type of rotor substantially heavier, and requires an additional flange on each inter-disk screwed joint, increasing the weight still further, and making assembly more complex.

SUMMARY

As aspect of the invention is therefore, in particular, to improve the situation.

It proposes to this end, in particular, a turbine rotor which can be fitted to a turbomachine and which includes at least two disks, each containing a coupling portion with recesses, each one of which holds the root of a blade, which are coupled to one another by a first annular ferrule which is rigidly connected with one of them close to the recesses.

This turbine rotor is characterised by the fact that:
it also includes second rotationally coupled ferrules, which are respectively coupled radially to the disks, which each consists of at least two semi-annular sectors, and which form with the associated disk a space which communicates with the recesses of the coupling portion of this latter disk, and
each first ferrule includes through-holes which enable air to enter this space, and then the recesses, intended to cool the portion which couples its disk and the blade roots held in these recesses.

Cooling air can thus beneficially be fed, directly (i.e. without it having to travel any distance), into the portions which couple the disks and the blades, without mixing it with the hot stream air which flows under the DBPs, before this cooling air has time to be heated.

The turbine rotor according to an embodiment of the invention can include other characteristics which can be considered separately or in combination and, in particular:
its through-holes can be calibrated to define a predefined flow rate of air entering the space defined by a sector of the second ferrule and the associated disk;
each first ferrule can include an annular rib and each disk coupling portion can include an end portion with protrusions defining radial stops. In this case each sector of a second ferrule can include a first end coupled to the rib of a corresponding sector of the first ferrule to which it is coupled, and a second end coupled to a corresponding sector of the coupling portion of an associated disk under the protrusions;
the approximate shape of the cross-section of the first end of each second ferrule can be an inverted U, such that it partially holds the rib of the first associated ferrule;
in a first variant, the approximate shape of the cross-section of the first end of each second ferrule can be an inverted L, such that it cooperates with the rib of the first associated ferrule to prevent its second ferrule from tipping into the space (which communicates with the recesses);
in a second variant, the approximate shape of the cross-section of the first end of each second ferrule can be an inverted L, and each first ferrule can include an annular groove at the base of the rib, partially holding an annular snap ring, and against which the first end of the second associated ferrule presses;

the snap ring may be of the "sacrificial" type;

the second end of each sector of a second ferrule can include catches which are blocked radially by the protrusions, and are separated from one another by holes (or slots) each tightly holding a lug forming part of a blade root, ensuring rotational coupling with the associated disk;

the protrusions can be less wide than a width of the lugs.

An aspect of the invention also proposes a turbine, possibly of the low-pressure type, able to be fitted to a turbomachine, containing a turbine rotor of the type described above.

An aspect of the invention also proposes a turbomachine including a turbine of the type described above.

An aspect of the invention also proposes an aircraft including at least one turbomachine of the type described above.

BRIEF DESCRIPTION OF THE DRAWINGS

Other characteristics and benefits of aspects of the invention will be seen clearly on an examination of the detailed description below, and the appended illustrations, in which.

DETAILED DESCRIPTION

An aspect of the invention is, in particular, to propose a turbine rotor RT which can be fitted to a turbomachine, including a system configured to cool coupling portions PC and PA of its disks DR and blades AR.

In what follows it is considered, as an example and non-restrictively, that the turbomachine is a turbojet intended to be fitted to an aircraft. But the invention is not restricted to this type of turbomachine. Indeed, it concerns all turbomachines containing a bladed turbine and coupled disks. It thus also concerns turboprops fitted, in particular, to aircraft, and industrial gas turbine turbomachines.

Furthermore, it is considered in what follows, as a non-restrictive example, that the turbine (which includes a rotor RT according to an embodiment of the invention) is of the low-pressure type. But it could also be of the high-pressure type, provided it includes at least two high-pressure disks.

Furthermore, it is considered in what follows, as a non-restrictive example, that rotor RT is of the spool type. But it could be of another type, and in particular of a "drilled disk" type or with inter-disk flanging.

Figure 1:
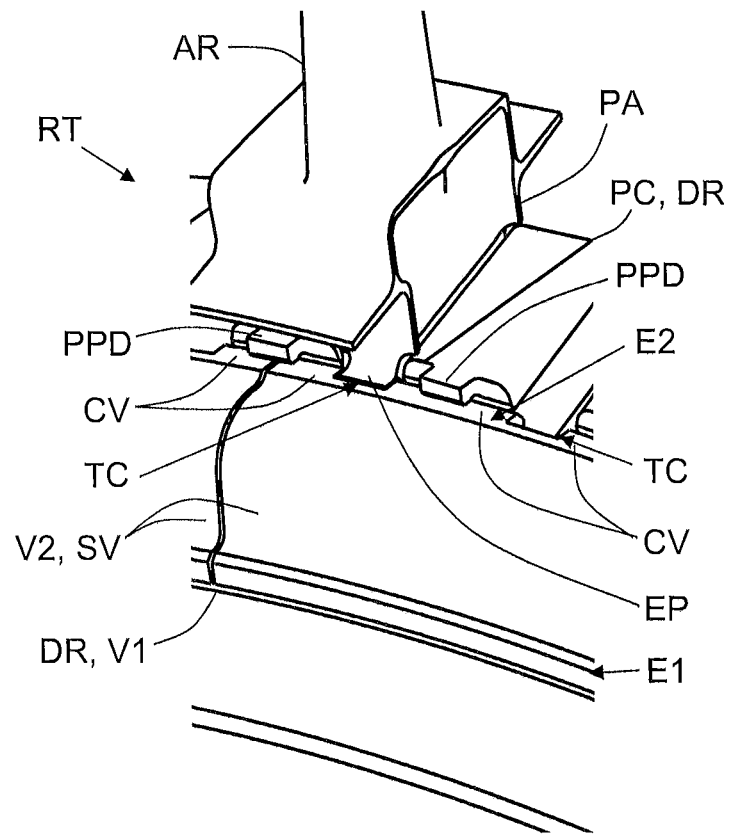
FIG. 1 illustrates diagrammatically, in a perspective view, a small portion of an example embodiment of a turbine rotor according to an embodiment of the invention.
Figure 2:
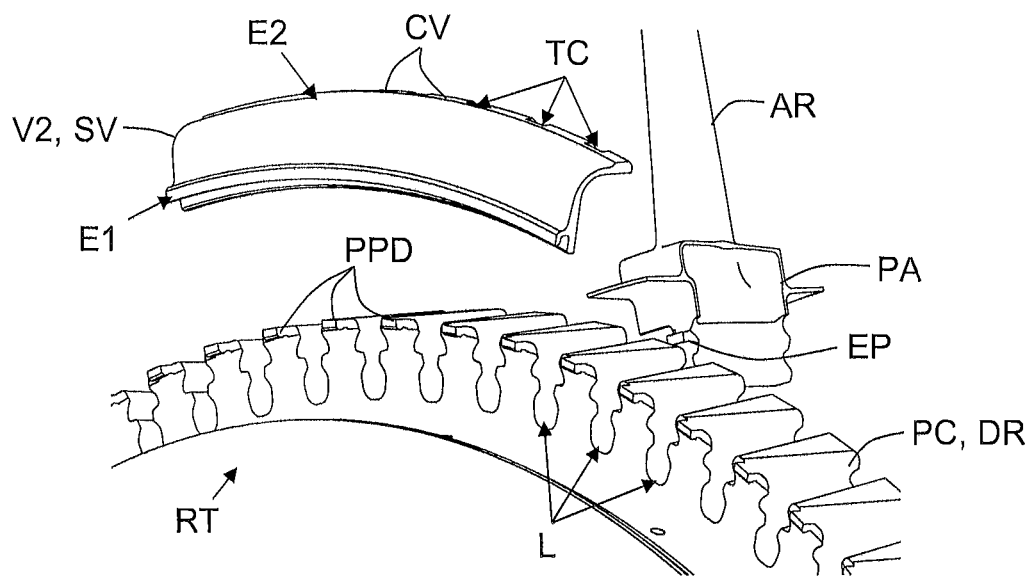
FIG. 2 illustrates diagrammatically, in a perspective view, a portion of disk, a blade root and a first example embodiment of a sector of a second ferrule of the turbine rotor according to the invention, before their assembly.

FIGS. 1 and 2 illustrate diagrammatically a small part of an example embodiment of a (turbine) rotor RT according to the invention, respectively after and before assembly of its constituents.

As illustrated, a (turbine) rotor RT according to an embodiment of the invention includes at least two disks DR, blades AR, and second ferrules V2 equal in number to the number of disks DR.

As an illustrative (and therefore non-restrictive) example, the number of disks DR may be equal to five. But this number may have any value greater than or equal to two.

As can be better seen in FIG. 2, disks DR each include a coupling portion PC with recesses (or cells) L, each intended to hold a root PA of a blade AR. These disks DR are coupled to one another by a first annular ferrule V1 which is securely and rigidly attached to one of them close to recesses L. It will be noted that in the case of a rotor RT of the spool type each first ferrule V1 is securely and rigidly attached to the two coupling portions PC of two adjacent disks DR, and more specifically forms an integral part of its two coupling portions PC, constituting an inter-disk connection.

Figure 3:
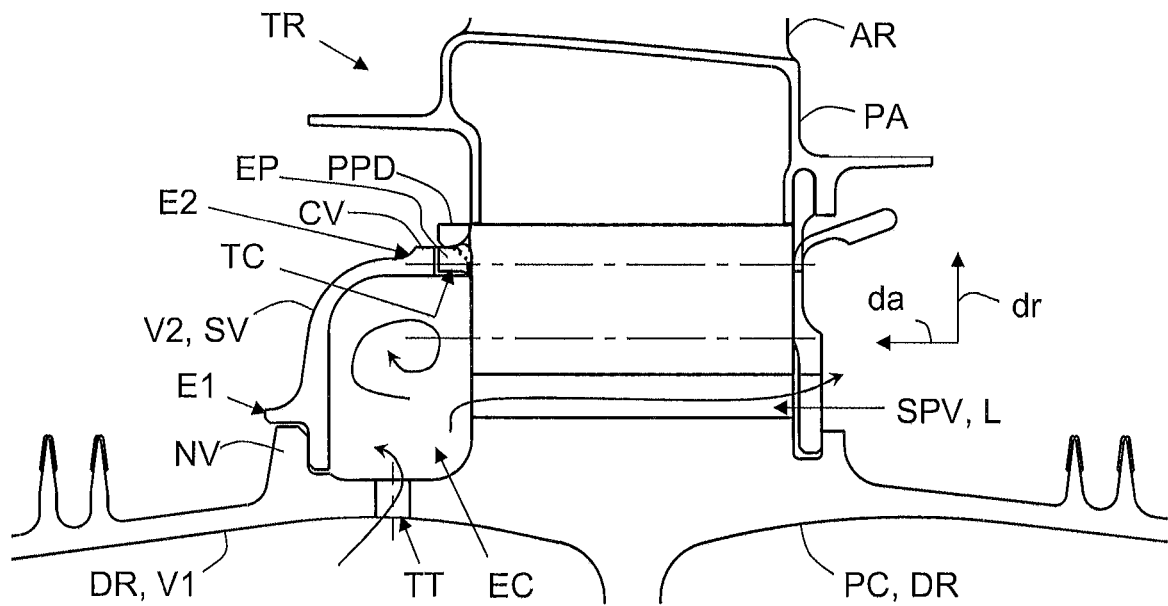
FIG. 3 illustrates diagrammatically, in a cross-section view, a portion of a turbine rotor disk according to an embodiment of the invention coupled to a portion of a blade and a portion of a second example embodiment of a sector of a second ferrule of this same turbine rotor.
Figure 4:
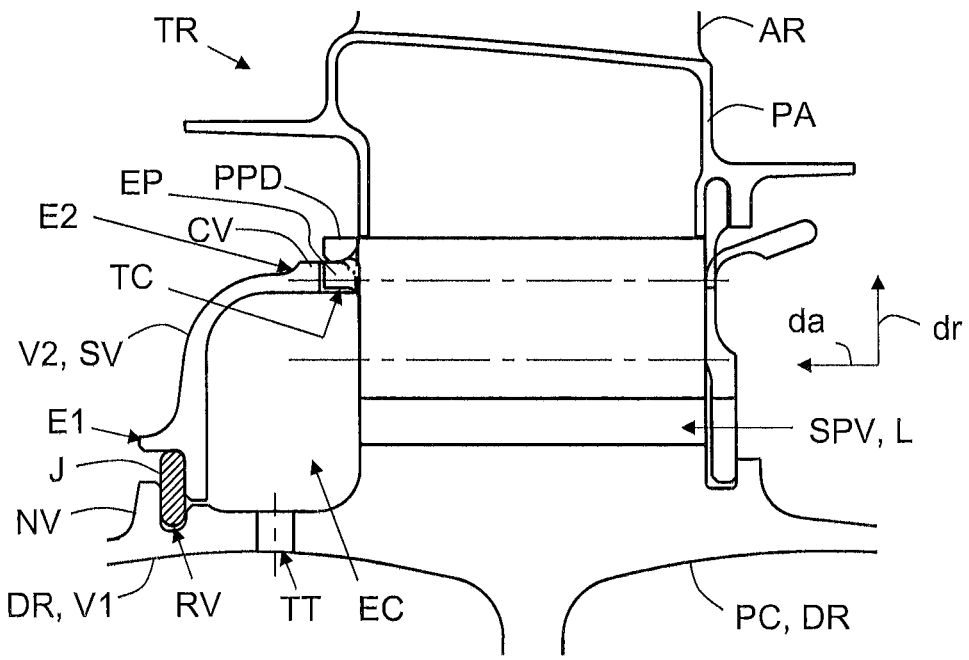
FIG. 4 illustrates diagrammatically, in a cross-section view, a portion of a turbine rotor disk according to an embodiment of the invention coupled to a portion of a blade and a portion of a third example embodiment of a sector of a second ferrule of this same turbine rotor.

It will be noted, as illustrated in FIGS. 3 and 4, that each recess L is in an embodiment fitted such that it contains, behind associated blade root PA, a void sub-portion SPV communicating with the exterior through its opposite ends, when it holds a portion of this blade root PA. The benefit of this void sub-portion SPV will be understood below.

Each second ferrule (or collector) V2 is associated with a first ferrule V1 and with a coupling portion PC of a disk DR. In addition, as can be seen in FIGS. 1, 3 and 4, each second ferrule V2 is rotationally and radially coupled to coupling portion PC of a disk DR, and consists of at least two semi-annular sectors SV forming with coupling portion PC of associated disk DR a space EC which communicates with recesses L of this coupling portion PC.

As can be seen in FIGS. 3 and 4, each first ferrule V1 includes through-holes TT which are such that they allow air intended to cool the area of coupling portion PC of its disk DR subject to most stress (i.e. the area including recesses L) into space EC and then into recesses L (which communicate with this space EC).

As can also be seen in FIGS. 3 and 4, space EC communicates with a first end of void sub-portion SPV of each recess L of coupling portion PC which partially defines it. The air which enters space EC via through-holes TT can thus then enter these void sub-portions (or cell bottoms) SPV, in order to cool them, and then be expelled through the second ends (opposite the first ends) of these void sub-portions SPV.

Due to these second ferrules V2, which are compact and therefore of low mass, cooling air can beneficially be supplied, directly (i.e. without it having to travel any distance) to coupling portions PC and PA respectively of disks DR and of blades AR. This cooling air is thus not mixed with the hot stream air which flows under the DBPs, and does not have to sweep over a long distance over an inner face of a wall the outer face of which is swept over by this hot stream air, as is the case with a labyrinth ring. This results in improved cooling efficiency compared to that provided by a labyrinth ring.

Through-holes TT may be calibrated so as to define a predefined airflow rate entering space EC with which they communicate.

For example, each first ferrule V1 can include an annular rib NV, and each coupling portion PC of a disk DR can include an end portion with protrusions PPD which define radial stops.

The term "radial stop" is understood to mean a stop which is intended to prevent a movement in a radial direction dr beyond its own position (see FIGS. 3 and 4). Furthermore, the term "radial direction" is understood to mean a direction which is perpendicular to the main rotational axis of rotor RT, and therefore of associated blades AR and disks DR.

When these ribs NV and protrusions PPD are present each sector SV of a second ferrule V2 can include a first end E1 which is coupled to rib NV of a corresponding sector of first ferrule V1 to which it is coupled, and a second end E2 which is coupled to a corresponding sector of coupling portion PC of an associated disk DR under protrusions PPD of the latter (PC).

It will be understood that this example arrangement is intended to couple radially each second ferrule V2 to coupling portion PC of associated disk DR.

Several embodiments can be envisaged to couple each first end E1 of a second ferrule V2 to rib NV of first associated ferrule V1.

A first example is illustrated non-restrictively in FIGS. 1 and 2. In this first example, the approximate shape of the cross-section of first end E1 of each second ferrule V2 is an inverted U, such that it partially holds rib NV of first associated ferrule V1. It will be understood that this first end E1, which has the approximate shape of an inverted U, defines a kind of runner partially holding associated rib NV, which enables second ferrule V2 to be immobilised in an axial direction da which is parallel to the main axis of rotation of rotor RT, and therefore perpendicular to radial direction dr.

A second example is illustrated non-restrictively in FIG. 3. In this second example, the approximate shape of the cross-section of first end E1 of each second ferrule V2 is an inverted L, such that it cooperates with rib NV of first associated ferrule V1 to prevent its second ferrule V2 from tipping into the space EC. It will be understood that the first portion of first end E1 which constitutes the base of the inverted L extends in axial direction da and presses against the free end of rib NV, whereas the second portion of first end E1, which is perpendicular to the first portion, is positioned against the face of rib NV which is aligned in the direction of recesses L of its coupling part PC. This enables second ferrule V2 to be immobilised (or blocked) in axial direction da.

A third example is illustrated non-restrictively in FIG. 4. In this third example (a variant of the second), the approximate shape of the cross-section of first end E1 of each second ferrule V2 is an inverted L, and each first ferrule V1 includes an annular groove RV at the base of its rib NV, partially holding an annular snap ring J, and against which first end E1 of second associated ferrule V2 presses (and which is therefore compressed by this first end E1).

For example, the overall diameter of this snap ring J when subject to no load may be greater than its housing diameter in disk DR. It will be understood that the first portion of first end E1 which constitutes the base of the inverted L extends in axial direction da and presses against the free end of snap ring J, whereas the second portion of first end E1, which is perpendicular to the first portion, is positioned against the face of snap ring J which is aligned in the direction of recesses L of its coupling part PC. This enables second ferrule V2 to be immobilised in axial direction da, and prevents wear and tear of rib NV (which would require a costly repair of disk DR—and snap ring J will become worn instead of rib NV).

For example, snap ring J may be of the "sacrificial" type, i.e. intended to be used as a wear part.

To cause second ferrule V2 to be coupled rotationally with associated disk DR, second end E2 of each sector SV of this second ferrule V2 can include catches CV which are radially blocked by protrusions PPD and separated from one another by holes (or slots) TC which each tightly hold a lug EP forming part of a blade root PA. This is what is illustrated in the non-restrictive examples of FIGS. 1 to 4. Each lug EP extends roughly in axial direction da.

The width of protrusions (or radial stops) PPD is preferably less than the width of lugs EP. By this means the constituents of rotor RT may be assembled as follows.

First, each sector SV of a second ferrule (or collector) V2 can be inserted in radial direction de, inserting protrusions (or radial stops) PPD through through-holes (or slots) TC.

Care should therefore be taken to allow sufficient clearance in the various holes TC of each sector SV of second ferrule V2 in order that this sector SV may be inserted without interference with protrusions (or radial stops) PPD.

After this, when all sectors SV of second ferrule V2 have been radially inserted, these sectors SV are rotated relative to associated disk DR, so as to position each hole (or slot) TC opposite a recess (or cell) L. This results in sectors SV of second ferrule V2 being radially blocked/held, via their catches CV, by protrusions (or radial stops) PPD of disk DR.

After this, each blade root PA in corresponding recess (or cell) L is inserted until its lug EP is held (or engaged) in hole (or slot) TC, which has been previously positioned opposite its recess (or cell) L, enabling second ferrule (or collector) V2 to be blocked rotationally relative to disk DR.

The invention is not restricted to the turbine rotor, turbine and turbomachine embodiments described above only as examples, but encompasses all variants which those skilled in the art might envisage solely in the context of the claims below.

The invention claimed is:

1. A turbine rotor to be fitted to a turbomachine including at least two disks, each disk of the at least two disks containing a coupling portion with a plurality of recesses, each recess of the plurality of recesses holding a root of a blade, and said at least two disks being coupled to one another by a first annular ferrule that is attached to one of said at least two disks close to the plurality of recesses, the turbine rotor also including second rotationally coupled ferrules which are respectively coupled radially to the at least two disks and each of the second rotationally coupled ferrules consisting of at least two semi-annular sectors and forming with one of the at least two disks a space communicating with the recesses of the coupling portion of said one of the at least two disks, wherein said first annular ferrule includes through-holes configured to allow air intended to cool the coupling portion of said one of the at least two disks and the root of the blade held in the recess to enter the space and then the recess, wherein each of the at least two semi-annular sectors includes a second end coupled to a corresponding sector of the coupling portion of said one of the at least two disks, the second end including catches which are separated from one another by holes each tightly holding a lug forming part of the root of the blade, ensuring rotational coupling with said one of the at least two disks.

2. The turbine rotor according to claim 1, wherein said first annular ferrule includes an annular rib, wherein the coupling portion of said one of the at least two disks includes an end portion with protrusions defining radial stops, and wherein each of the at least two semi-annular sectors includes a first end coupled to the annular rib of the first annular ferrule to which it is coupled, and the second end is coupled to the coupling portion under the protrusions.

3. The turbine rotor according to claim 2, wherein a general shape of a cross-section of the first end is an inverted U, such that it partially holds the annular rib of the first annular ferrule.

4. The turbine rotor according to claim 2, wherein a general shape of a cross-section of the first end is an inverted L, such that the first end cooperates with the annular rib to prevent said second rotationally coupled ferrules from tipping into the space.

5. The turbine rotor according to claim 2, wherein a general shape of a cross-section of the first end is an inverted L, and wherein said first annular ferrule includes an annular groove, located at a base of said annular rib, partially holding an annular snap ring, against which the first end presses.

6. The turbine rotor according to claim 5, wherein said annular snap ring is of a sacrificial type.

7. The turbine rotor according to claim 2, wherein the catches are blocked radially by said protrusions.

8. The turbine according to claim 7, wherein said protrusions are less wide than a width of said lugs.

9. A turbine for a turbomachine, comprising a turbine rotor according to claim 1.

10. A turbomachine, comprising said turbine according claim 9.

* * * * *